Patented Sept. 5, 1933

1,925,985

UNITED STATES PATENT OFFICE 1,925,985

LIGHT-WEIGHT CERAMIC TILE AND METHOD OF MAKING SAME

Harold T. Coss, Somerville, N. J., assignor to Johns-Manville Corporation, New York, N. Y., a corporation of New York No Drawing. Application October 2, 1931
Serial No. 566,585

10 Claims. (Cl. 25—156)

The present invention relates to improvements in the manufacture of light-weight permeable ceramic products, and particularly to such products in the form of brick or tile adapted for use for heat insulation and acoustical purposes.

Heretofore, various processes have been proposed and employed for producing light-weight ceramic articles by procedures involving the admixture of an organic filler with a clay mix, molding the mixture to shape, drying, and then burning out the filler during firing of the shaped article thereby providing numerous voids throughout the mass. The manufacture of tile suitable for acoustical purposes by this procedure is described in U. S. Patent No. 1,119,543 to Sabine and Guastavino.

In the manufacture of permeable ceramic products by the above methods, there has been ascertained to be a definite limit to the degree of porosity or permeability which could be imparted to the product due to the ensuing manufacturing difficulties which resulted particularly in an unduly large decrease in strength upon addition of sufficient filler to provide the desired increase in the amount of voids. In acoustical material for instance a high degree of permeability characterized by a spongelike pore structure is essential for a high degree of acoustical effectiveness, and processes such as typified by that described in the Sabine et al. patent are not suitable for providing products of this desired character.

The present invention is based upon the discovery that an exceptionally high degree of permeability and a particularly desirable pore structure may be obtained by admixing the organic filler such as sawdust, with the clay together with sufficient water to provide a fluid or semi-fluid consistency in the mixture. In following this procedure a much greater degree of porosity and permeability is produced than would be expected from the quantity of filler employed. The amount of water added may vary materially. Preferably the water added is sufficient in amount to provide a flowable mixture of a consistency adapted for fabrication by casting. The amount of water employed is in substantial excess of that ordinarily added to clay mixtures when they are shaped by dry molding or extrusion methods and is sufficient in amount to impart upon addition of the organic filler the relatively high permeability and porosity above noted. While my invention is not limited to any particular theory of action, it is probable that the increased permeability and porosity may be attributed to a large extent to a permanent entrainment of air bubbles which occurs upon the addition of the filler to the fluid clay mix and accordingly the amount of water employed in general should be sufficient to obtain this effect. The entrapment of air by the filler results in numerous small air cells intermixed with the voids left by combustion of the filler. Also the increased permeability may be partially attributed to the removal of the relatively large quantity of water initially employed according to my process in the subsequent operations.

In one mode of practicing my invention the organic filler as for example a soft wood sawdust may be added to the fluid clay mix, in proportion such as to provide a mixture of castable consistency, casting the resulting admixture into suitable shapes, drying the cast mass, and then firing to burn out the filler material and develop a ceramic bond in the mass.

In accordance with the preferred embodiment of the invention a small amount of a cementitious material particularly a hydraulic cement such as calcined gypsum, Portland cement or high-alumina cement is added to the mix prior to casting.

A further feature of my invention resides in the control of temperatures during burning of the product to provide a product of high strength and permeability. Various other features and advantages of the invention will be apparent from a consideration of the following illustrative embodiment thereof:

| Formula initial mix | Percent by weight |
|---|---|
| Clay (Somerset, N. J., ball clay) | 56.7 |
| Calcined gypsum | 13.1 |
| Sawdust (soft wood, finer than 4 mesh) | 32.1 |
| Water | 103 |

Consistency suitable for casting.

The solid constituents of the above formula are dry mixed, and then added to the requisite quantity of water. The admixture is then thoroughly mixed in a suitable mixing device such as the usual type of revolving paddle mixer which will quickly blend the ingredients without deaerating them. The mixture is then poured into molds preferably coated with a water repellent material such as paraffine oil, or lined with waxed paper to facilitate ready removal of the castings. In cases where the initial mixture is fairly viscous, complete filling of the mold may be facilitated by jarring it. Following the above formula, 15 minutes has been found to be sufficient time to permit the castings to attain sufficient strength to permit of their removal from the molds. Omission of the setting agent—the gypsum, or substitution of a material of slower setting characteristics renders it necessary to retain the castings in the molds longer until setting occurs, or even to allow them to remain in the molds until dried and hardened to a sufficient strength to permit removal. The castings after removal from the molds are placed preferably on their side edge surface in a dryer and dried. With bricks of ordinary size of the above formula a temperature of about 225° F. maintained over a period of 12 hours has been found sufficient for drying. The dried castings are then placed in a suitable kiln on their side edge surface and heated to a temperature suitable for burning out the sawdust or other combustible filler and for ceramically bonding the clay. It has been found to be decidedly advantageous to effect this heating operation in two stages, an initial "soaking" period wherein the temperature is sufficiently high to gradually coke and burn out the combustible filler but below the temperature at which the clay materially shrinks or is ceramically bonded, and then subjecting the product to a second heating period at a relatively high temperature sufficient to ceramically bond the clay. The temperature during the soaking stage suitably varies from 700 to 900° F. and is maintained over a period of about four hours. The kiln is then gradually elevated in temperature i. e., to about 2200° F. over a period of about four hours and maintained at the elevated temperature for about the same period. It will be understood of course that departures from these specific heating periods and temperatures may occur in the practice of the invention.

After firing and cooling, a face of the product may be ground down to remove any superficial crust which may be present to expose the intercommunicating pore structure of the interior.

A specimen of the product made in accordance with the formula and procedure outlined above exhibited the following properties:

Density, lbs./cu. ft_____ 24.5
Percent linear shrinkage (cast to fired)___ 8.2
Modulus of rupture, lbs./sq. inch_____ 90.0

The product due to its porosity and permeability has high utility when employed either for acoustical or heat insulation purposes, or as a light-weight building material for general structural purposes. It may be treated similarly to wood as it is readily sawn or nailed. For acoustical purposes the product may be suitably employed in the form of tile secured to the surface to be acoustically treated by plaster or other adhesive. For heat insulation purposes the product is employed as a substitute for the various forms of heat insulation bricks and blocks now in common use.

The constituents of the initial mix and procedure may of course be varied from the illustrative embodiment described above. Various kinds of clays or argillaceous material or blends thereof may be employed. However, in general the preferred clay is essentially like ball clay or fire-clay of the New Jersey type with high drying strength and low drying shrinkage. Other types of organic fillers or finely divided combustible material have been used with success besides softwood sawdust, as for example, hardwood sawdust, partially coked hardwood and softwood alone and mixed, jute fiber, cork raw and partially coked, and peat. Raw softwood sawdust is inexpensive and burns out readily and is preferred for these reasons. Although a definite grading of screen size of the sawdust such as through 4 and on 8 mesh, 33% by volume; through 8 and on 20 mesh, 33% by volume; and through 20 and finer, 34% by volume has proven especially satisfactory, variations in size to introduce certain architectural effects, and greater or less permeability may be used. In the illustrative example given in the foregoing, the proportions of the initial mix were 56.7% clay, 13.1% plaster, 32.1% sawdust and 103% water. The water content may be varied from 80% to 120% of the batch weight but best results are obtained when it is practically equal to the batch weight. The sawdust may suitably vary from 25 to 40% and the plaster from 10 to 20%. The clay may vary from about 45% as a minimum to 65% as a maximum. In general, a final fired density of at least 22.5 lbs./cu. ft. is desirable to give a product adequately strong to withstand ordinary hazards of transportation and installation.

A quick-setting hydraulic cement such as gypsum is the preferred material for facilitating removal of the casting from the molds and the reduction of shrinkage during drying. However, other material serving these same functions in whole or part may be substituted therefore.

All proportions and percentages expressed herein are in terms of parts by weight.

The terms "hydraulic cement" or "hydraulic cementitious material" are used herein to indicate a material of setting properties such as those of calcined gypsum plaster or Portland cement.

The details that have been given are for the purpose of illustration, and variations within the scope of the appended claims may be made without departing from the spirit of the invention.

What I claim is:

1. A process of manufacturing shaped, lightweight, ceramic products which comprises forming a flowable mixture of castable consistency including water, an argillaceous material, and a finely divided combustible material, casting the mixture into a mold, drying the casting, and firing the dried casting to burn out the combustible material and develop a ceramic bond in the mass.

2. A process of manufacturing shaped, permeable, ceramic products which comprises forming a flowable mixture of castable consistency including water, an argillaceous material, a setting agent, and a finely divided combustible material, casting the mixture into a mold, allowing the mixture to stand until the setting agent therein sets, drying the casting, and firing the dried casting to burn out the combustible material and develop a ceramic bond in the mass.

3. A process of manufacturing shaped, lightweight, ceramic products which comprises forming a flowable mixture of castable consistency including water, an argillaceous material, a substance adapted to prevent shrinkage during drying, and a finely divided combustible material, casting the mixture into a mold, drying the casting, and firing the dried casting to burn out the combustible material and develop a ceramic bond in the mass.

4. A process of manufacturing shaped, lightweight, ceramic products which comprises forming a flowable mixture of castable consistency including water, an argillaceous material, a hardening agent, and a finely divided combustible material, casting the mixture into a mold, allowing the mixture to stand until the hardening agent becomes hard, drying the casting, and firing the dried casting to burn out the combustible material and develop a ceramic bond in the mass.

5. A process of manufacturing shaped, light-weight, ceramic products which comprises forming a flowable mixture of castable consistency including water, an argillaceous material, a hydraulic cementitious material, and a finely divided combustible material, casting the mixture into a mold, allowing the mixture to stand until the cementitious material therein sets, drying the casting, and firing the dried casting to burn out the combustible material and develop a ceramic bond in the mass.

6. A process of manufacturing shaped, light-weight, permeable, ceramic products which comprises forming a flowable mixture of castable consistency including water, ball clay of high drying strength and low drying shrinkage, a quick-setting hydraulic cement, and a finely divided combustible material, casting the mixture into a mold, drying the castings, and firing the dried casting to burn out the combustible material and develop a ceramic bond in the mass.

7. A process of manufacturing shaped permeable ceramic products which comprises forming a flowable mixture of castable consistency including water, an argillaceous material, gypsum plaster, and a finely divided combustible material, casting the mixture into a mold, allowing the mixture to stand until the plaster therein sets, drying the casting, and firing the dried product to burn out the combustible material and develop a ceramic bond in the mass.

8. A process of manufacturing shaped porous ceramic products which comprises forming a flowable mixture of castable consistency including water, an argillaceous material, a hydraulic cement, and sawdust, casting the mixture into a mold, allowing the mixture to stand until the hardening agent therein hardens, drying the casting, and firing the dried casting to burn out the sawdust and develop a ceramic bond in the mass.

9. A process of manufacturing shaped, light-weight, ceramic products which comprises forming a flowable mixture of castable consistency including water, clay, a hardening agent, and a finely divided combustible material, casting the mixture into a mold, drying the casting, firing the dried casting at a temperature and for a period sufficient to burn out the combustible material and insufficient to cause substantial shrinkage and ceramic bonding of the clay, and then firing the mass at a more elevated temperature adapted to ceramically bond the mass.

10. A light-weight, shaped, permeable, ceramic, product comprising the fired residue of a dried casting composed of an admixture including water, clay, a hydraulic cement, and a void introducing material consisting of a finely divided combustible material.

HAROLD T. COSS.

DISCLAIMER 1,925,985.—*Harold T. Coss*, Somerville, N. J. LIGHT-WEIGHT CERAMIC TILE AND METHOD OF MAKING SAME. Patent dated September 5, 1933. Disclaimer filed October 17, 1935, by the assignee, *Johns-Manville Corporation*.

Hereby enters this disclaimer to that part of the claim in said specification which is in the following words, to wit:

"1. A process of manufacturing shaped, light-weight, ceramic products which comprises forming a flowable mixture of castable consistency including water, an argillaceous material, and a finely divided combustible material, casting the mixture into a mold, drying the casting, and firing the dried casting to burn out the combustible material and develop a ceramic bond in the mass."

[*Official Gazette November 5, 1935.*]

agent becomes hard, drying the casting, and firing the dried casting to burn out the combustible material and develop a ceramic bond in the mass.

5. A process of manufacturing shaped, light-weight, ceramic products which comprises forming a flowable mixture of castable consistency including water, an argillaceous material, a hydraulic cementitious material, and a finely divided combustible material, casting the mixture into a mold, allowing the mixture to stand until the cementitious material therein sets, drying the casting, and firing the dried casting to burn out the combustible material and develop a ceramic bond in the mass.

6. A process of manufacturing shaped, light-weight, permeable, ceramic products which comprises forming a flowable mixture of castable consistency including water, ball clay of high drying strength and low drying shrinkage, a quick-setting hydraulic cement, and a finely divided combustible material, casting the mixture into a mold, drying the castings, and firing the dried casting to burn out the combustible material and develop a ceramic bond in the mass.

7. A process of manufacturing shaped permeable ceramic products which comprises forming a flowable mixture of castable consistency including water, an argillaceous material, gypsum plaster, and a finely divided combustible material, casting the mixture into a mold, allowing the mixture to stand until the plaster therein sets, drying the casting, and firing the dried product to burn out the combustible material and develop a ceramic bond in the mass.

8. A process of manufacturing shaped porous ceramic products which comprises forming a flowable mixture of castable consistency including water, an argillaceous material, a hydraulic cement, and sawdust, casting the mixture into a mold, allowing the mixture to stand until the hardening agent therein hardens, drying the casting, and firing the dried casting to burn out the sawdust and develop a ceramic bond in the mass.

9. A process of manufacturing shaped, light-weight, ceramic products which comprises forming a flowable mixture of castable consistency including water, clay, a hardening agent, and a finely divided combustible material, casting the mixture into a mold, drying the casting, firing the dried casting at a temperature and for a period sufficient to burn out the combustible material and insufficient to cause substantial shrinkage and ceramic bonding of the clay, and then firing the mass at a more elevated temperature adapted to ceramically bond the mass.

10. A light-weight, shaped, permeable, ceramic product comprising the fired residue of a dried casting composed of an admixture including water, clay, a hydraulic cement, and a void introducing material consisting of a finely divided combustible material.

HAROLD T. COSS.

DISCLAIMER 1,925,985.—*Harold T. Coss*, Somerville, N. J. LIGHT-WEIGHT CERAMIC TILE AND METHOD OF MAKING SAME. Patent dated September 5, 1933. Disclaimer filed October 17, 1935, by the assignee, *Johns-Manville Corporation*.

Hereby enters this disclaimer to that part of the claim in said specification which is in the following words, to wit:

"1. A process of manufacturing shaped, light-weight, ceramic products which comprises forming a flowable mixture of castable consistency including water, an argillaceous material, and a finely divided combustible material, casting the mixture into a mold, drying the casting, and firing the dried casting to burn out the combustible material and develop a ceramic bond in the mass."

[*Official Gazette November 5, 1935.*]

DISCLAIMER 1,925,985.—*Harold T. Coss*, Somerville, N. J. LIGHT-WEIGHT CERAMIC TILE AND METHOD OF MAKING SAME. Patent dated September 5, 1933. Disclaimer filed October 17, 1935, by the assignee, *Johns-Manville Corporation*.

Hereby enters this disclaimer to that part of the claim in said specification which is in the following words, to wit:

"1. A process of manufacturing shaped, light-weight, ceramic products which comprises forming a flowable mixture of castable consistency including water, an argillaceous material, and a finely divided combustible material, casting the mixture into a mold, drying the casting, and firing the dried casting to burn out the combustible material and develop a ceramic bond in the mass."

[*Official Gazette November 5, 1935.*]